United States Patent
Uchiyama et al.

(10) Patent No.: US 8,770,016 B2
(45) Date of Patent: Jul. 8, 2014

(54) DPF FAILURE DETECTION METHOD AND DPF FAILURE DETECTION DEVICE

(75) Inventors: Tadashi Uchiyama, Fujisawa (JP);
Hidekazu Fujie, Fujisawa (JP);
Mitsuhiro Aso, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 168 days.

(21) Appl. No.: 13/579,122

(22) PCT Filed: Mar. 2, 2011

(86) PCT No.: PCT/JP2011/054765
§ 371 (c)(1),
(2), (4) Date: Aug. 15, 2012

(87) PCT Pub. No.: WO2011/111584
PCT Pub. Date: Sep. 15, 2011

(65) Prior Publication Data
US 2012/0318055 A1    Dec. 20, 2012

(30) Foreign Application Priority Data
Mar. 10, 2010 (JP) ................................ 2010-053426

(51) Int. Cl.
*G01M 15/10* (2006.01)
(52) U.S. Cl.
USPC ...................................................... 73/114.75
(58) Field of Classification Search
USPC ............... 73/114.69, 114.71, 114.75, 114.77
See application file for complete search history.

(56) References Cited

U.S. PATENT DOCUMENTS

| | | | |
|---|---|---|---|
| 7,278,304 B2 * | 10/2007 | Zanini-Fisher et al. | ... 73/114.71 |
| 7,650,781 B2 * | 1/2010 | Keski-Hynnila et al. | .. 73/114.76 |
| 2008/0156084 A1 * | 7/2008 | Keski-Hynnila et al. | .. 73/114.69 |
| 2012/0297750 A1 * | 11/2012 | Sun | ................................. 60/274 |
| 2014/0033680 A1 * | 2/2014 | Swoish et al. | .................. 60/274 |

FOREIGN PATENT DOCUMENTS

| | | |
|---|---|---|
| JP | 2002-021537 | 1/2002 |
| JP | 2005-344619 | 12/2005 |
| JP | 2006-153716 | 6/2006 |
| JP | 2007-262973 | 10/2007 |
| JP | 2008-267199 | 11/2008 |

OTHER PUBLICATIONS

PCT Search Report for PCT U.S. Appl. No. PCT/JP2011/054765 dated May 13, 2011.

* cited by examiner

*Primary Examiner* — Eric S McCall
(74) *Attorney, Agent, or Firm* — McCormick, Paulding & Huber LLP

(57) ABSTRACT

The present invention provides a DPF failure detection method and a DPF failure detection device, which can be realized with a simple configuration and detect a failure at low cost. The theoretical deposited amount of PM on a DPF 4 is calculated from the operating state of an internal combustion engine 2. The actual deposited amount of the PM on the DPF 4 is measured based on the electrical capacitance of an electrical capacitance type PM sensor 6. When the divergence of the actual deposited amount from the theoretical deposited amount exceeds an allowable limit, it is determined that the DPF 4 has a failure.

10 Claims, 5 Drawing Sheets

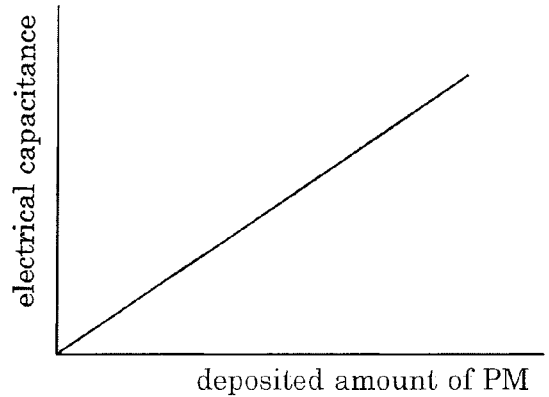
Fig.4
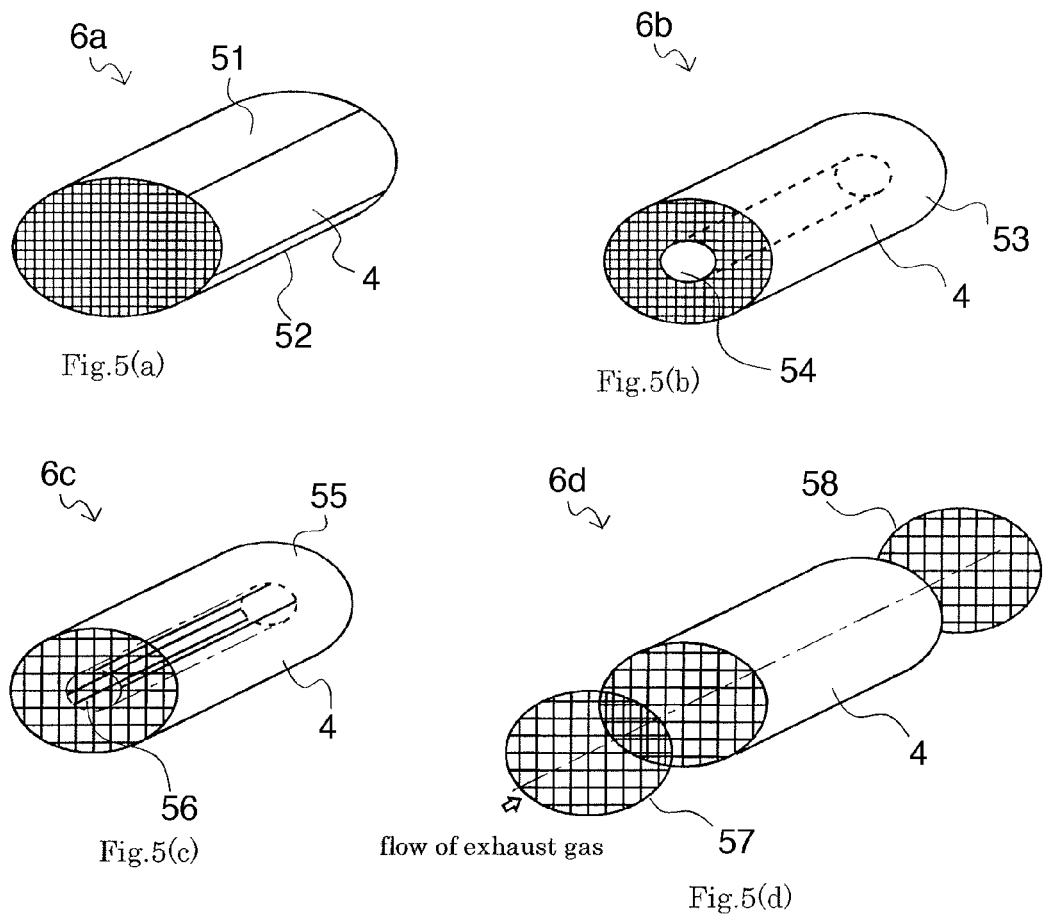
Fig.5(a)
Fig.5(b)
Fig.5(c)
Fig.5(d)

US 8,770,016 B2

DPF FAILURE DETECTION METHOD AND DPF FAILURE DETECTION DEVICE

CROSS REFERENCE TO RELATED APPLICATIONS

This application is entitled to the benefit of and incorporates by reference essential subject matter disclosed in International Patent Application No. PCT/JP2011/054765 filed on Mar. 2, 2011 and Japanese Patent Application No. 2010-053426 filed Mar. 10, 2010.

TECHNICAL FIELD

The present invention relates to a DPF failure detection method and a DPF failure detection device for detecting a failure in a DPF for collecting PM of exhaust gas in an internal combustion engine. More particularly, the present invention relates to a DPF failure detection method and a DPF failure detection device that can be realized with a simple configuration and detect a failure at low cost.

BACKGROUND ART

In a vehicle equipped with an internal combustion engine such as a diesel engine, an exhaust pipe for guiding exhaust gas from the internal combustion engine to the atmosphere has a diesel particulate filter (DPF), wherein a particulate matter (PM) such as soot contained in the exhaust gas is collected. The DPF, mainly made of ceramic, is a filter that has a number of honeycomb holes (or square holes). In the DPF, the PM adheres to the surface of the honeycomb holes serving as passages for the exhaust gas, whereby the PM is collected.

However, if the DPF is damaged or cracks, then the DPF cannot collect the PM sufficiently, causing the PM to flow out to the downstream side of the DPF and releasing the PM to the atmosphere. In order to prevent this defect, it is desired that a failure in the DPF be detected and handled promptly. In view of such circumstances, in the U.S., it is mandated under the OBD (on-board diagnosis) regulation that a vehicle be equipped with a DPF failure detection monitor.

In conventional technologies, mainly a differential pressure sensor for measuring a difference in pressure in front of and behind a DPF is installed, wherein when an output value of the differential pressure sensor significantly falls below an output range of a normal state of the DPF, it is determined that the DPF has a failure. However, there is a possibility that a method using such a differential pressure sensor has a problem in its detection accuracy and cannot cope with the regulations that become tighter in the future. Therefore, there has been known the technology disclosed in Japanese Patent Application Publication No. 2006-153716 as a PM sensor for detecting the amount of PM in exhaust gas.

However, the PM sensor disclosed in Japanese Patent Application Publication No. 2006-153716 is a fixed equipment used for research and development of internal combustion engines and is not suitable to be installed in a vehicle.

For instance, although a DPF failure detection device to be installed in a vehicle needs to be small, the PM sensor disclosed in Japanese Patent Application Publication No. 2006-153716 consumes a high voltage reaching as much as 2000 to 7000 V and. Such a device tends to be massive in size, weighty, and expensive.

Furthermore, the PM sensor of Japanese Patent Application Publication No. 2006-153716 consumes high voltages and therefore needs to devise safety measures for electrical insulation, again causing a cost increase. An additional concern is that radiation noise is caused due to the consumption of high voltages.

DISCLOSURE OF THE INVENTION

Therefore, an object of the present invention is to solve the problems described above and to provide a DPF failure detection method and a DPF failure detection device that can be realized with a simple configuration and detect a failure at low cost.

A DPF failure detection method of the present invention for achieving the object described above is a diesel particulate filter (referred to as "DPF" hereinafter) failure detection method for detecting a failure in a DPF that is arranged in an exhaust pipe guiding exhaust gas from an internal combustion engine to the atmosphere, this DPF failure detection method including: calculating a deposited amount (referred to as "theoretical deposited amount" hereinafter) of a particulate matter (referred to as "PM" hereinafter) deposited on the DPF from an operating state of the internal combustion engine; measuring a deposited amount (referred to as "actual deposited amount" hereinafter) of the PM on the DPF based on an electrical capacitance of an electrical capacitance type PM sensor configured by two electrodes disposed in the DPF; and determining that the DPF has a failure, when a divergence of the actual deposited amount from the theoretical deposited amount exceeds an allowable limit.

A DPF failure detection device of the present invention is a diesel particulate filter (referred to as "DPF" hereinafter) failure detection device for detecting a failure in a DPF that is arranged in an exhaust pipe guiding exhaust gas from an internal combustion engine to the atmosphere, this DPF failure detection device including: a theoretical deposited amount calculator that calculates a deposited amount (referred to as "theoretical deposited amount" hereinafter) of a particulate matter (referred to as "PM" hereinafter) on the DPF from an operating state of the internal combustion engine; an electrical capacitance type PM sensor that is configured by two electrodes disposed in the DPF; an actual deposited amount measuring unit that measures a deposited amount referred to as "actual deposited amount" hereinafter) of the PM on the DPF (based on an electrical capacitance of the electrical capacitance type PM sensor; and a failure diagnosis unit that determines that the DPF has a failure, when a divergence of the actual deposited amount from the theoretical deposited amount exceeds an allowable limit, the actual deposited amount being measured by the actual deposited amount measuring unit while the theoretical deposited amount being calculated by the theoretical deposited amount calculator.

The theoretical deposited amount calculator may have a PM generation amount calculator that calculates an amount of PM generated in the internal combustion engine; a PM regeneration amount calculator that calculates an amount of PM regenerated passively in the DPF; and a deduction calculator that deducts the amount of PM regenerated from the amount of PM generated in order to calculate the theoretical deposited amount.

The PM generation amount calculator may calculate a basic amount of PM (basic amount) generated by the internal combustion engine on the basis of an engine speed, an amount of fuel, and an EGR rate, calculate a transient amount of PM (transient amount) generated by the internal combustion engine on the basis of the engine speed, the amount of fuel, and an air-fuel ratio, and calculate the amount of PM generated as a sum of the basic amount and the transient amount.

The PM regeneration amount calculator may calculate an amount of PM regenerated by heat in the DPF (heat regeneration amount) on the basis of the air-fuel ratio, an amount of oxygen, and a DPF temperature, calculate an amount of PM regenerated by reacting with $NO_2$ ($NO_2$ regeneration amount) on the basis of an amount of $NO_2$ generated, an exhaust gas temperature, and an exhaust gas volume, and calculate the amount of PM regenerated (PMr) as a sum of the heat regeneration amount and the $NO_2$ regeneration amount.

The deduction calculator may be configured by a difference unit for obtaining a difference between the amount of PM generated and the amount of PM regenerated, and an accumulation unit for accumulating the difference while the internal combustion engine is operated, wherein the theoretical deposited amount is obtained as a result of the accumulation of the difference between the amount of PM generated and the amount of PM regenerated, and wherein new accumulation of the difference is started after the theoretical deposited amount is cleared at the time of DPF forced regeneration.

The electrical capacitance type PM sensor may be provided with one electrode disposed along one side of the DPF and another electrode disposed along the other side of the DPF.

The electrical capacitance type PM sensor may be provided with one cylindrical electrode so as to cover the entire DPF and another cylindrical electrode disposed at a core of the DPF.

The electrical capacitance type PM sensor may be provided with one cylindrical electrode so as to cover the entire DPF and another electrode configured by a plurality of wires disposed at the core of the DPF.

The electrical capacitance type PM sensor may be provided with mesh electrodes disposed at an upstream side and downstream side of the DPF.

The present invention has the following excellent effects.

(1) The present invention can be realized with a simple configuration.

(2) The present invention can detect a failure at low cost.

BRIEF DESCRIPTION OF THE DRAWINGS

FIG. 4 is a characteristic diagram of an electrical capacitance type PM sensor used in the DPF failure detection device according to the present invention;

FIGS. 5(a) to 5(d) are schematic configuration diagrams each showing a PM sensor used in the DPF failure detection device according to the present invention.

BEST MODE FOR CARRYING OUT THE INVENTION

An embodiment of the present invention is described hereinafter with reference to the accompanying drawings.

Figure 1:
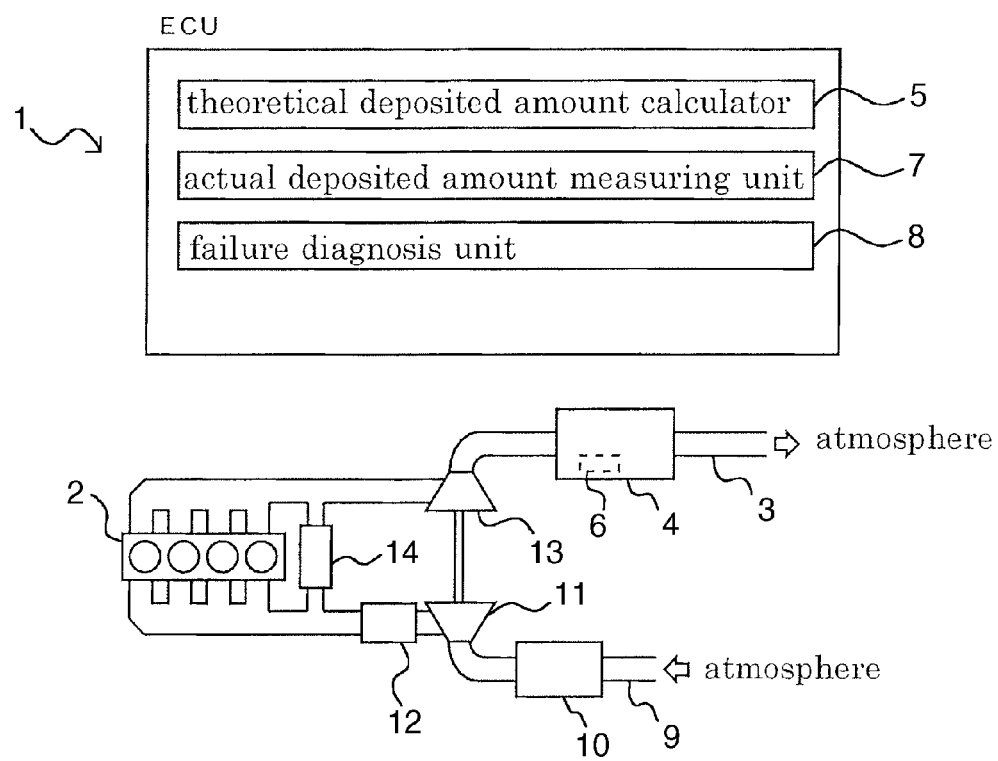
FIG. 1 is a configuration diagram of a DPF failure detection device according to an embodiment of the present invention.

As shown in FIG. 1, a DPF failure detection device 1 according to the present invention detects a failure in a diesel particulate filter (referred to as "DPF" hereinafter) 4 that is arranged in an exhaust pipe 3 guiding exhaust gas from an internal combustion engine 2 to the atmosphere. The DPF failure detection device 1 has: a theoretical deposited amount calculator unit 5 that calculates the deposited amount of a particulate matter (referred to as "PM" hereinafter) on the DPF 4 (referred to as "theoretical deposited amount" hereinafter) from an operating state of the internal combustion engine 2; an electrical capacitance type PM sensor 6 that is configured by two electrodes disposed in the DPF 4; an actual deposited amount measuring unit 7 that measures the deposited amount of the PM on the DPF 4 (referred to as "actual deposited amount" hereinafter) based on an electrical capacitance of the electrical capacitance type PM sensor 6; and a failure diagnosis unit 8 that determines that the DPF 4 has a failure, when a divergence of the actual deposited amount from the theoretical deposited amount exceeds an allowable limit, the actual deposited amount being measured by the actual deposited amount measuring unit 7 and the theoretical deposited amount being calculated by the theoretical deposited amount calculator 5.

The internal combustion engine 2 is a diesel engine. An intake pipe 9 for supplying air to the internal combustion engine 2 is provided with a MAF sensor 10 for detecting the amount of intake air, a compressor 11 of a turbocharger, and an intake air cooler 12, which are disposed sequentially starting from the atmosphere side. The exhaust pipe 3 is provided with a turbine 13 of the turbocharger and the DPF 4, which are disposed sequentially starting from the internal combustion engine 2 side. An EGR device 14 for circulating the exhaust gas to the admission at an appropriate EGR rate is disposed between an exhaust manifold and an intake manifold of the internal combustion engine 2.

The DPF 4 is a conventionally known ceramic filter and has a number of honeycomb holes. In the present invention, however, the DPF 4 is provided with an electrode of the electrical capacitance type PM sensor 6.

Figure 2:
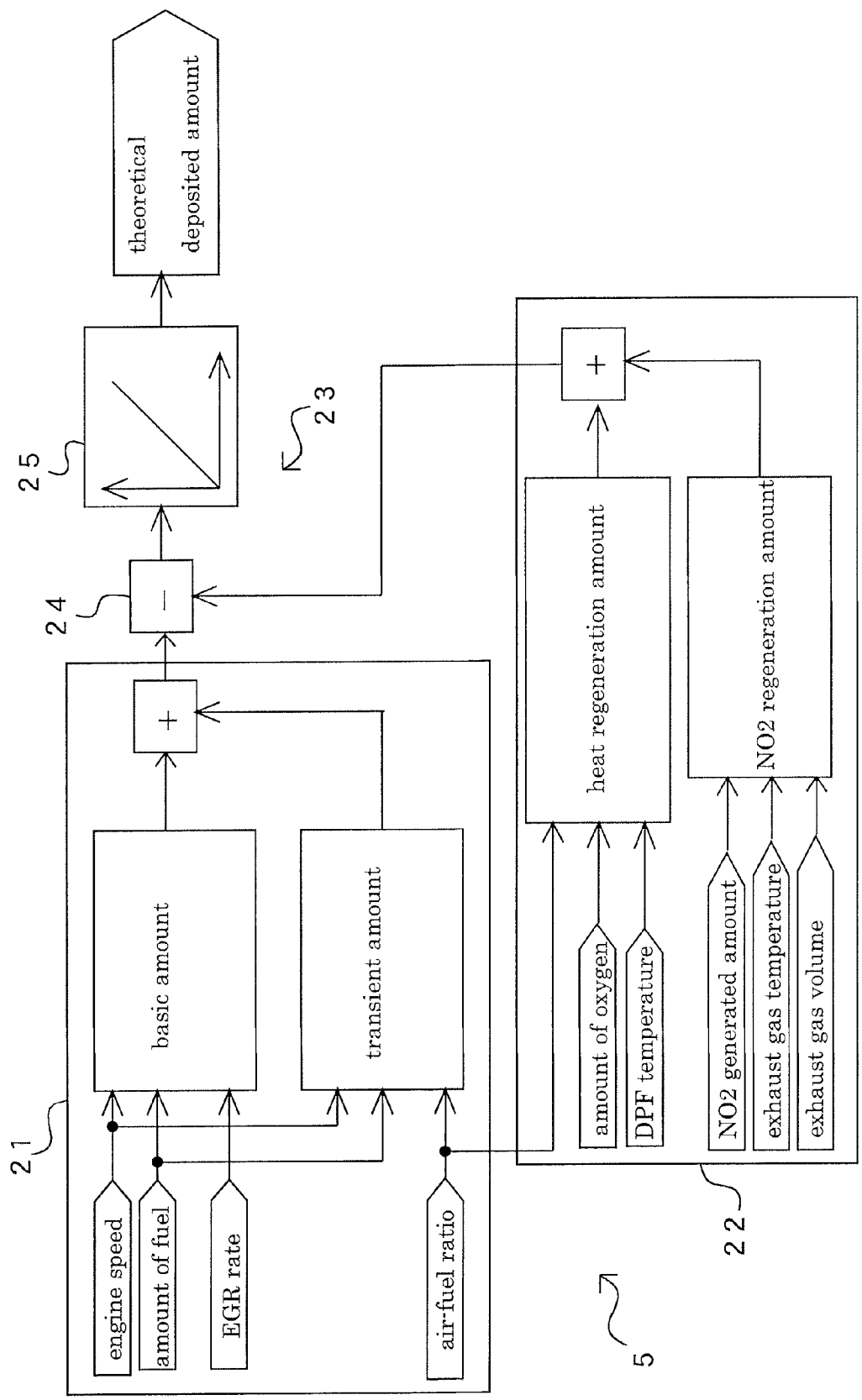
FIG. 2 is a block diagram showing details of calculation performed by a theoretical deposited amount calculator of the DPF failure detection device according to the present invention.

As shown in FIG. 2, the theoretical deposited amount calculator unit 5 has a PM generation amount calculator 21 for calculating the amount of PM generated by the internal combustion engine 2, a PM regeneration amount calculator 22 for calculating the amount of PM regenerated passively in the DPF 4, and a deduction calculator 23 used for deducting the amount of PM regenerated from the amount of PM generated to calculate the theoretical deposited amount.

The PM generation amount calculator 21 calculates the basic amount of PM (basic amount) generated by the internal combustion engine 2 on the basis of an engine speed, the amount of fuel, and an EGR rate. The PM generation amount calculator 21 further calculates the transient amount of PM (transient amount) generated by the internal combustion engine 2 on the basis of the engine speed, the amount of fuel, and an air-fuel ratio, and calculates the amount of PM generated (PMi) as a sum of the basic amount and the transient amount. It is preferred that an approximation formula obtained by experiment or a map obtained by experiment be used in each of these calculations.

The PM regeneration amount calculator 22 calculates the amount of PM regenerated by heat in the DPF 4 (heat regeneration amount) on the basis of the air-fuel ratio, the amount of oxygen, and a DPF temperature. The PM regeneration amount calculator 22 further calculates the amount of PM regenerated by reacting with $NO_2$ (NOx reduction, PM oxidation) ($NO_2$ regeneration amount) on the basis of the amount of $NO_2$ generated, an exhaust gas temperature, and an exhaust gas volume, and calculates the amount of PM regenerated (PMr) as a sum of the heat regeneration amount and the $NO_2$ regeneration amount. It is preferred that an approximation formula obtained by experiment or a map obtained by experiment be used in each of these calculations.

The deduction calculator 23 has a difference unit 24 for obtaining a difference between the amount of PM generated (PMi) and the amount of PM regenerated (PMr), and an accumulation unit 25 for accumulating the difference, while the internal combustion engine 2 is operated. The amount of PM that should be deposited on the DPF 4, or the theoretical deposited amount PMb, is obtained as a result of the accumulation of the difference between the amount of PM generated (PMi) and the amount of PM regenerated (PMr). The theoretical deposited amount PMb is obtained in the following arithmetic expression.

$$PMb = \int (PMi - PMr) dt \qquad \text{[Expression 1]}$$

In a vehicle equipped with the DPF 4, so-called DPF forced regeneration takes place. In the DPF forced regeneration, the exhaust gas temperature is increased by the fuel injection control where additional fuel injection is performed, if needed, after main fuel injection in the internal combustion engine 2, thereby combusting and removing the PM deposited on the DPF 4. On the basis of the arithmetic expression above, the theoretical deposited amount PMb is cleared at the time of the DPF forced regeneration so that new accumulation of the difference is started.

The passive regeneration, on the other hand, removes the PM on the DPF 4 without carrying out any special regeneration control. For instance, as shown in a passive regeneration region in FIG. 3(*a*), in an engine state where the engine speed is high and the torque is large, the exhaust gas temperature is significantly high, thereby combusting the PM accumulated on the DPF 4. This is called heat regeneration. In addition, because the exhaust gas temperature is high, the PM is oxidized by reacting the PM with $NO_2$ of the exhaust gas, thereby causing $NO_2$ regeneration.

Figure 3A:
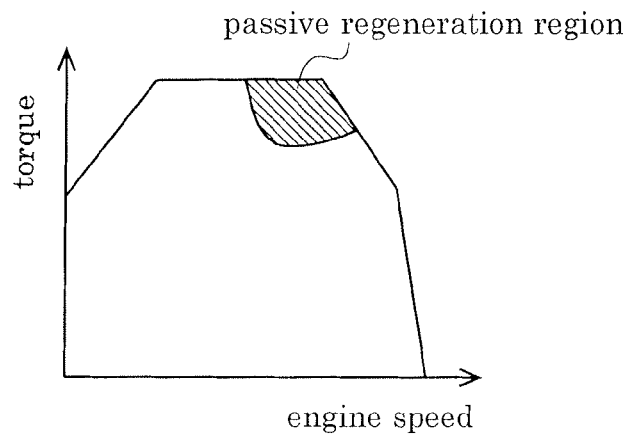
FIG. 3(a) is an engine state graph showing engine speeds and torques two-dimensionally.
Figure 3B:
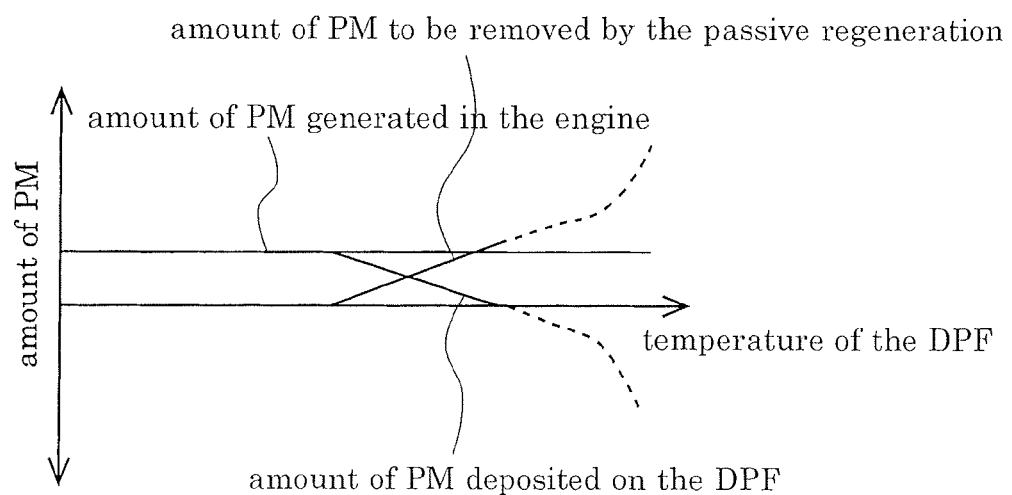
FIG. 3(b) is a graph showing a correlation with a PM amount to a DPF temperature.
Figure 6A:
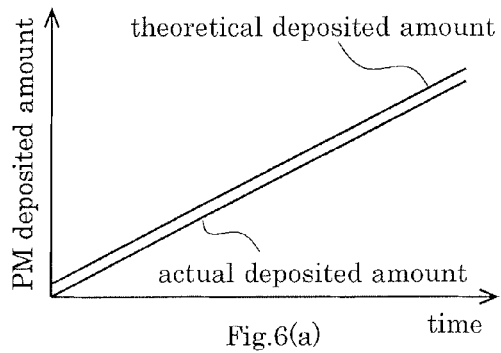
FIGS. 6(a) to 6(d) are graphs each showing changes in the theoretical deposited amount and the actual deposited amount which are obtained in the DPF failure detection device according to the present invention.
Figure 6B:
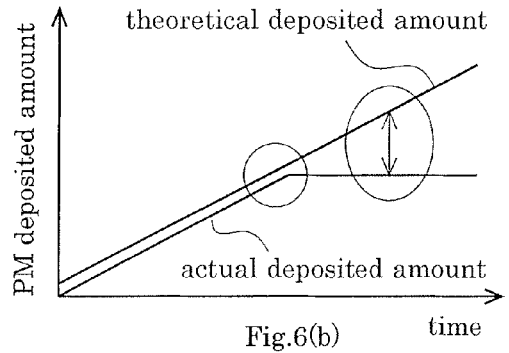
Figure 6C:
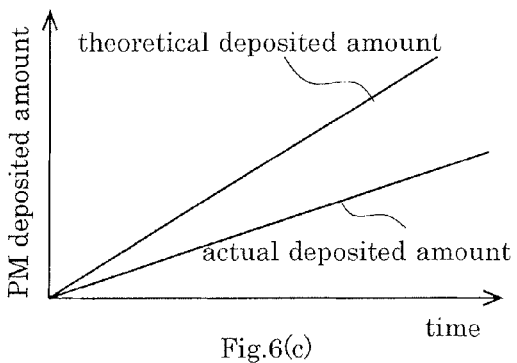
Figure 6D:
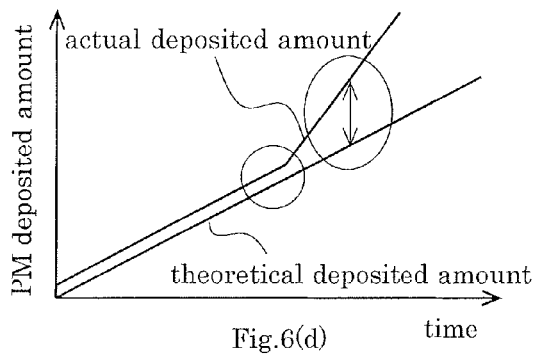
Figure 6E:
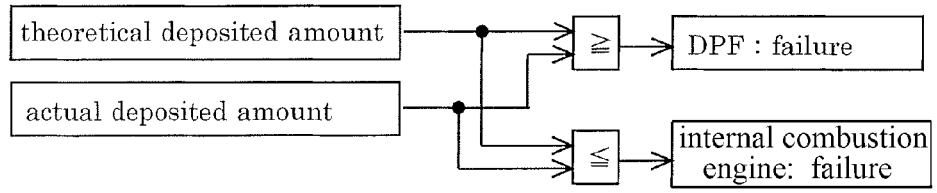
FIG. 6(e) is a block diagram of a failure diagnosis unit.

As shown in FIG. 3(*b*), given that the amount of PM generated in the internal combustion engine 2 is constant, the amount of PM to be removed by the passive regeneration increases as the temperature of the DPF 4 rises, reducing the amount of PM deposited on the DPF 4. The amount of PM regenerated due to the exhaust gas temperature (the DPF temperature) corresponds to the abovementioned heat regeneration amount and $NO_2$ regeneration amount.

In the electrical capacitance type PM sensor 6 shown in FIG. 1, the electrical capacitance between two electrodes provided in the DPF 4 changes according to the deposited amount of PM collected. In other words, the following relationship is satisfied:

$$C = \epsilon \times S/d. \qquad \text{[Expression 2]}$$

In this expression, C represents the electrical capacitance, $\epsilon$ a permittivity, S an electrode area, and d an interelectrode distance. This expression follows the principle where the electrical capacitance C increases as the PM increases in a medium between the electrodes and the permittivity $\epsilon$ becomes high.

Therefore, the electrical capacitance type PM sensor 6 is characterized in that the electrical capacitance increases in proportion to the increase in the deposited amount of PM collected in the DPF 4, as shown in FIG. 4.

An electrical capacitance type PM sensor 6*a* shown in FIG. 5(*a*) is provided with one electrode 51, in the shape of a piece of a cylinder, disposed along one-half of an outer circumference of the cylindrical DPF 4 and another electrode 52, also in the shape of a piece of a cylinder, disposed along the other half. Therefore, the two electrodes 51 and 52 face each other with the DPF 4 therebetween. When the PM is collected by the DPF 4, the electrical capacitance changes under the influence of the PM existing between the electrodes 51 and 52.

An electrical capacitance type PM sensor 6*b* shown in FIG. 5(*b*) is provided with one cylindrical electrode 53 so as to cover the entire outer circumference of the cylindrical DPF 4 and another cylindrical electrode 54 disposed at a core of the DPF 4. Therefore, the two electrodes 53 and 54 are disposed concentrically inside and outside the DPF 4. When the PM is collected by the DPF 4, the electrical capacitance changes under the influence of the PM existing between the electrodes 53 and 54.

An electrical capacitance type PM sensor 6*c* shown in FIG. 5(*c*) is provided with one cylindrical electrode 55 so as to cover the entire outer circumference of the cylindrical DPF 4 and another electrode 56 configured by a plurality of wires disposed to form a cylinder in the core of the DPF 4.

An electrical capacitance type PM sensor 6*d* shown in FIG. 5(*d*) is provided with two mesh electrodes 57 and 58 disposed at an upstream side and downstream side of the cylindrical DPF 4 respectively.

The embodiment is described with reference to FIG. 1 again.

The actual deposited amount measuring unit 7 has a measurement map that is set based on the characteristics shown in FIG. 4 and detects the electrical capacitance of the electrical capacitance type PM sensor 6 to measure the deposited amount of PM based on the detected electrical capacitance with reference to the measurement map. For example, the actual deposited amount measuring unit 7 uses a variable capacitor capable of controlling the electrical capacitance within an appropriate electrical capacitance range, to detect an electrical equilibrium between the electrical capacitance type PM sensor 6 and the variable capacitor while sweeping an electrical capacitance of the variable capacitor in the abovementioned range, and then reads an electrical capacitance control value of the variable capacitor as the electrical capacitance of the electrical capacitance type PM sensor 6 once the equilibrium is achieved.

The failure diagnosis unit 8 obtains the divergence of the actual deposited amount from the theoretical deposited amount, the actual deposited amount being measured by the actual deposited amount measuring unit 7 and the theoretical deposited amount being calculated by the theoretical deposited amount calculator 5, and determines that the DPF 4 has a failure, when the divergence exceeds the allowable limit. Specifically, the failure diagnosis unit 8 calculates the difference between the theoretical deposited amount and the actual deposited amount or calculates a difference between an increase rate of the theoretical deposited amount and an increase rate of the actual deposited amount when the actual deposited amount is smaller than the theoretical deposited amount. When the difference between the theoretical deposited amount and the actual deposited amount is equal to or greater than a predetermined value, or when the difference in the increase rate is equal to or greater than the predetermined value, the failure diagnosis unit 8 determines that the DPF 4 has a failure.

When the actual deposited amount is greater than the theoretical deposited amount, the failure diagnosis unit 8 calculates the difference between the actual deposited amount and the theoretical deposited amount or calculates the difference between the increase rate of the actual deposited amount and the increase rate of the theoretical deposited amount. When the difference between the theoretical deposited amount and the actual deposited amount is equal to or greater than the predetermined value or when the difference in the increase rate is equal to or greater than the predetermined value, the failure diagnosis unit 8 determines that there is an engine failure in which a large amount of PM is discharged.

It is preferred that the theoretical deposited amount calculator 5, the actual deposited amount measuring unit 7, and the failure diagnosis unit 8 be realized by a digital circuit operated by a program and be incorporated in an electronic control unit (ECU) that controls the fuel injection, transmission, and the like of the vehicle.

Operations of the DPF failure detection device 1 of the present invention are described hereinafter.

As shown in FIG. 6(*a*), the theoretical deposited amount increases with time. In this embodiment, however, for the sake of convenience, given that the engine state is constant, the theoretical deposited amount increased linearly. Moreover, given that the DPF 4 is in an excellent condition, the actual deposited amount also increases in the same manner as the theoretical deposited amount. Note in each diagram that the theoretical deposited amount is shifted from the actual deposited amount, in order to distinguish therebetween; however, in reality the actual deposited amount and the theoretical deposited amount overlap on each other.

As shown in FIG. 6(*b*), the increase of the actual deposited amount slows down, when a failure occurs in the DPF 4 and causes the PM to flow out to the downstream side of the DPF 4. In the illustrated example, the actual deposited amount stops increasing from the point when the failure occurs (shown in the circle). As a result, the difference between the actual deposited amount and the theoretical deposited amount grows (shown in the ellipse). When the difference becomes equal to or greater than a predetermined value, the failure diagnosis unit 8 determines that the DPF 4 has a failure. Alternatively, the failure diagnosis unit 8 may determine that the DPF 4 has a failure, when the difference in increase rate between the actual deposited amount and the theoretical deposited amount is equal to or greater than the predetermined value.

As shown in FIG. 6(*c*), when the DPF 4 has a failure from the beginning, the theoretical deposited amount increases linearly at a constant increase rate, whereas the actual deposited amount increases linearly at a low increase rate. In this case as well, the failure diagnosis unit 8 determines that the DPF 4 has a failure, when the difference between the actual deposited amount and the theoretical deposited amount is equal to or greater than the predetermined value or when the difference in increase rate is equal to or greater than the predetermined value.

As shown in FIG. 6(*d*), when a large amount of PM is generated in the internal combustion engine 2, the actual deposited amount increases more significantly than the theoretical deposited amount. As a result, the difference therebetween grows (shown by the ellipse). When the difference becomes equal to or greater than the predetermined value, the failure diagnosis unit 8 can determine that a failure that may generate a large volume of PM in the internal combustion engine 2 has occurred.

As shown in FIG. 6(*e*), when the actual deposited amount is smaller than the theoretical deposited amount, and when the difference between the theoretical deposited amount and the actual deposited amount is equal to or greater than the predetermined value, the failure diagnosis unit 8 determines that the DPF 4 has a failure. When the actual deposited amount is greater than the theoretical deposited amount, and when the difference between the actual deposited amount and the theoretical deposited amount is equal to or greater than the predetermined value, the failure diagnosis unit 8 determines that the internal combustion engine 2 has a failure.

Once the failure diagnosis unit 8 determines that the DPF 4 has a failure, audio-visual means notifies a driver of the result of the determination to enable prompt response to the determination.

As described above, the DPF failure detection method (or the DPF failure detection device 1) of the present invention calculates the theoretical deposited amount of the PM on the DPF 4 from the operating state of the internal combustion engine 2, measures the actual deposited amount of the PM on the DPF 4 based on the electrical capacitance of the electrical capacitance type PM sensor 6, and determines that the DPF 4 has a failure, when the divergence of the actual deposited amount from the theoretical deposited amount exceeds the allowable limit. Therefore, unlike the technology disclosed in Japanese Patent Application Publication No. 2006-153716, a failure can be detected with a simple configuration and at low cost. In other words, because high voltages are not required in the electrical capacitance type PN sensor 6 and an extremely simple configuration can be obtained, the technology of the present invention does not require any safety measures for electrical insulation or any countermeasures for radiation noise and therefore can be realized at low cost.

What is claimed is:

1. A diesel particulate filter (referred to as "DPF" hereinafter) failure detection method for detecting a failure in a DPF that is arranged in an exhaust pipe guiding exhaust gas from an internal combustion engine to the atmosphere, the DPF failure detection method comprising:
calculating a deposited amount (referred to as "theoretical deposited amount" hereinafter) of a particulate matter (referred to as "PM" hereinafter) deposited on the DPF from an operating state of the internal combustion engine;
measuring a deposited amount (referred to as "actual deposited amount" hereinafter) of the PM on the DPF based on an electrical capacitance of an electrical capacitance type PM sensor configured by two electrodes disposed in the DPF; and
determining that the DPF has a failure, when a divergence of the actual deposited amount from the theoretical deposited amount exceeds an allowable limit.

2. A diesel particulate filter (referred to as "DPF" hereinafter) failure detection device for detecting a failure in a DPF that is arranged in an exhaust pipe guiding exhaust gas from an internal combustion engine to the atmosphere, the DPF failure detection device comprising:
a theoretical deposited amount calculator that calculates a deposited amount (referred to as "theoretical deposited amount" hereinafter) of a particulate matter (referred to as "PM" hereinafter) on the DPF from an operating state of the internal combustion engine;
an electrical capacitance type PM sensor that is configured by two electrodes disposed in the DPF;
an actual deposited amount measuring unit that measures a deposited amount referred to as "actual deposited amount" hereinafter) of the PM on the DPF (based on an electrical capacitance of the electrical capacitance type PM sensor; and
a failure diagnosis unit that determines that the DPF has a failure, when a divergence of the actual deposited amount from the theoretical deposited amount exceeds an allowable limit, the actual deposited amount being measured by the actual deposited amount measuring unit while the theoretical deposited amount being calculated by the theoretical deposited amount calculator.

3. The DPF failure detection device according to claim 2, wherein
the theoretical deposited amount calculator has:
a PM generation amount calculator that calculates an amount of PM generated in the internal combustion engine;
a PM regeneration amount calculator that calculates an amount of PM regenerated passively in the DPF; and
a deduction calculator that deducts the amount of PM regenerated from the amount of PM generated in order to calculate the theoretical deposited amount.

4. The DPF failure detection device according to claim 3, wherein
the PM generation amount calculator:
calculates a basic amount of PM (basic amount) generated by the internal combustion engine on the basis of an engine speed, an amount of fuel, and an EGR rate;
calculates a transient amount of PM (transient amount) generated by the internal combustion engine on the basis of the engine speed, the amount of fuel, and an air-fuel ratio; and
calculates the amount of PM generated as a sum of the basic amount and the transient amount.

5. The DPF failure detection device according to claim 3, wherein
the PM regeneration amount calculator:
calculates an amount (heat regeneration amount) of PM regenerated by heat in the DPF on the basis of the air-fuel ratio, an amount of oxygen, and a DPF temperature;
calculates an amount ($NO_2$ regeneration amount) of PM regenerated by reacting with $NO_2$ on the basis of an amount of $NO_2$ generated, an exhaust gas temperature, and an exhaust gas volume; and
calculates the amount of PM regenerated (PMr) as a sum of the heat regeneration amount and the $NO_2$ regeneration amount.

6. The DPF failure detection device according to claim 3, wherein
the deduction calculator is configured by a difference unit for obtaining a difference between the amount of PM generated and the amount of PM regenerated, and an accumulation unit for accumulating the difference while the internal combustion engine is operated,
the theoretical deposited amount is obtained as a result of the accumulation of the difference between the amount of PM generated and the amount of PM regenerated, and
new accumulation of the difference is started after the theoretical deposited amount is cleared at the time of DPF forced regeneration.

7. The DPF failure detection device according to claim 2, wherein the electrical capacitance type PM sensor is provided with one electrode disposed along one side of the DPF and another electrode disposed along the other side of the DPF.

8. The DPF failure detection device according to claim 2, wherein the electrical capacitance type PM sensor is provided with one cylindrical electrode so as to cover the entire DPF and another cylindrical electrode disposed at a core of the DPF.

9. The DPF failure detection device according to claim 2, wherein the electrical capacitance type PM sensor is provided with one cylindrical electrode so as to cover the entire DPF and another electrode configured by a plurality of wires disposed at the core of the DPF.

10. The DPF failure detection device according to claim 2, wherein the electrical capacitance type PM sensor is provided with mesh electrodes disposed at an upstream side and downstream side of the DPF.

* * * * *